Patented July 18, 1933

1,918,884

UNITED STATES PATENT OFFICE

RUDOLF ZELLMANN, OF RADEBEUL-DRESDEN, GERMANY, ASSIGNOR TO CHEMISCHE FABRIK VON HEYDEN, A. G., OF DRESDEN, GERMANY, A CORPORATION OF GERMANY

THORIUM DIOXIDE SOL AND METHOD OF MAKING THE SAME

No Drawing. Application filed August 12, 1930, Serial No. 474,882, and in Germany November 18, 1929.

This invention relates to compounds for use as contrast mediums in X-ray photography, especially pyelography. It relates particularly to a stabilized colloidal thorium dioxide sol, which presents important advantages over the hitherto known unstabilized thorium dioxide of acid reaction, which, owing to their positive charge, coagulated or flocculated when brought into contact with mucosal surfaces or body fluids, or when neutralized by addition of alkali or other means.

The hitherto known unstabilized acid thorium dioxide sols are suitable for use as contrast mediums in X-ray photography of the surfaces of the intestine, as the thorium dioxide coagulates on the surface, thereby providing a good contrast medium for relief pictures of said surfaces, as obvious from Bluebaum Frek & Kalkbrenner Fortsch. der Roentgenstrahlen, Bd. 37, Heft 1.

However, for pyelographic use, such unstabilized acid thorium dioxide sols could be used only with great danger, owing to the fact that the coagulum would clog the small passages.

An unstabilized, acid reacting thorium dioxide sol may be prepared as follows:—
Thorium oxalate is heated to incandescence, and the resultant thorium dioxide is peptized by means of dilute aqueous hydrochloric acid, thereby forming an unstabilized, positively charged acid reacting thorium dioxide sol.

In the literature, so for instance in the well known textbook by Meyer-Iacobson, vol. I, 2nd part, page 907, the carbohydrates are classified:
I. Sugars not hydrolyzable=
   Mono-saccharides.
II. Hydrolyzable carbohydrates=
   Poly-saccharides.
     (a) Hydrolyzable sugars.
     (b) Polysaccharides other than sugars: starch, cellulose dextrin, etc.

I have now found that if such a sol is combined with a colloidal substance selected from a group consisting of starch and the colloidal or semi-colloidal substances obtained therefrom by splitting the same, i. e. by hydrolysis, namely amylose, malto-dextrine, amylodextrine and commercial dextrine, and the mixture is neutralized, the resultant product is highly stable thorium dioxide sol, which may be admixed with all body fluids, or brought into contact with mucosal surfaces with out change, such as coagulation or flocculation. This protective function which dextrin even if alkaline exerts in this case is quite remarkable, in that the materials which are ordinarily rated as strong protective agents fail in this instance.

Example.—Into a 12½% unstabilized, positively charged acid reacting thorium dioxide sol, I introduce 6% of dextrinum album and adjust to neutralize the mixture with caustic soda. The alkaline state of the solution is desirable for the reason that in case the thorium dioxide solution is to be sterilized, i. e., by heating the same to 100° C., the reaction turns weakly acid. This is avoided by adding a priori sufficient alkali metal hydroxide.

What I claim is:
1. The process of making thorium dioxide sol suitable for the production of sharp contrasts in pyelography, said process comprising adding a colloidal soluble substance selected from a group consisting of starch, amylose, maltodextrine, amylodextrine and commercial dextrine, to unstabilized, positively charged acid reacting thorium dioxide sol.

2. The process of making thorium dioxide sol suitable for the production of sharp contrasts in pyelography, said process comprising adding colloidal soluble splitting products of starch to unstabilized, positively charged acid reacting thorium dioxide sol.

3. The process of making thorium dioxide sol suitable for the production of sharp contrasts in pyelography, said process comprising adding dextrin to unstabilized, positively charged acid reacting thorium dioxide sol.

4. The process of making thorium dioxide sol suitable for the production of sharp contrasts in pyelography, said process comprising adding a colloidal soluble substance selected from a group consisting of starch, amylose, maltodextrine, amylodextrine and commercial dextrine, to unstabilized, positively charged acid reacting thorium dioxide sol, and neutralizing the reaction product.

5. The process of making thorium dioxide sol suitable for the production of sharp contrasts in pyelography, said process comprising adding colloidal soluble splitting products of starch to unstabilized, positively charged acid reacting thorium dioxide sol, and neutralizing the reaction product.

6. The process of making thorium dioxide sol suitable for the production of sharp contrasts in pyelography, said process comprising adding dextrin to unstabilized, positively charged acid reacting thorium dioxide sol, and neutralizing the reaction product.

7. The process of making thorium dioxide sol suitable for the production of sharp contrasts in pyelography, said process comprising adding a colloidal soluble substance selected from a group consisting of starch, amylose, maltodextrine, amylodextrine and commercial dextrine, to unstabilized, positively charged acid reacting thorium dioxide sol, and adding alkaline metal hydroxide to aforesaid mixture until the same shows an alkaline reaction.

8. The process of making thorium dioxide sol suitable for the production of sharp contrasts in pyelography, said process comprising adding colloidal soluble splitting products of starch to unstabilized, positively charged acid reacting thorium dioxide sol, and adding alkaline metal hydroxide to aforesaid mixture until the same shows an alkaline reaction.

9. The process of making thorium dioxide sol suitable for the production of sharp contrasts in pyelography, said process comprising adding dextrin to unstabilized, positively charged acid reacting thorium dioxide sol, and adding alkaline metal hydroxide to aforesaid mixture until the same shows an alkaline reaction.

10. As a contrast medium in X-ray photography, especially in pyelography, thorium dioxide sol, stabilized by a colloidal soluble substance selected from a group consisting of starch, amylose, maltodextrine, amylodextrine and commercial dextrine, said thorium dioxide sol being of neutral reaction, miscible with all body fluids and contacting with mucosal surfaces without coagulation and flocculation.

11. As a contrast medium in X-ray photography, especially in pyelography, thorium dioxide sol, stabilized by dextrin, said thorium dioxide sol being of neutral reaction, miscible with all body fluids and contacting with mucosal surfaces without coagulation and flocculation.

RUDOLF ZELLMANN.